(12) United States Patent
Brown et al.

(10) Patent No.: US 7,242,482 B2
(45) Date of Patent: Jul. 10, 2007

(54) CAPACITANCE GAP CALIBRATION

(75) Inventors: Matthew Brown, Corvallis, OR (US);
Eric Martin, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 190 days.

(21) Appl. No.: 11/214,698

(22) Filed: Aug. 30, 2005

(65) Prior Publication Data
US 2007/0046950 A1 Mar. 1, 2007

(51) Int. Cl.
*G01B 11/02* (2006.01)
*G01B 9/02* (2006.01)

(52) U.S. Cl. .................... 356/506; 356/519
(58) Field of Classification Search ............ 356/454, 356/505, 506, 519
See application file for complete search history.

(56) References Cited

U.S. PATENT DOCUMENTS

| 4,954,789 | A | 9/1990 | Sampsell | |
|---|---|---|---|---|
| 6,822,798 | B2 * | 11/2004 | Wu et al. | 359/578 |
| 6,915,048 | B2 * | 7/2005 | Kersey et al. | 385/50 |
| 7,110,122 | B2 * | 9/2006 | Van Brocklin et al. | 356/506 |
| 2002/0015215 | A1 | 2/2002 | Miles | |
| 2004/0218865 | A1 | 11/2004 | Lu | |
| 2004/0227493 | A1 | 11/2004 | VanBrocklin et al. | |
| 2005/0179912 | A1 | 8/2005 | VanBrocklin et al. | |

FOREIGN PATENT DOCUMENTS

DE 100 10 946 A1 9/2001

OTHER PUBLICATIONS

Chang et al, "A Novel Simple CBCM Method free From Charge Injection-Induced Errors", IEEE Electron Device Letters, V. 25(5), May 2004.
Maithiipala et al, "Nano-Precision Control fo Micromirrors Using Output Feedback", IEEE Conf on Decision and Control, V. 1 (6), Dec. 2003.

* cited by examiner

*Primary Examiner*—Gregory J. Toatley, Jr.
*Assistant Examiner*—Michael A Lyons

(57) ABSTRACT

A method for calibrating a display device comprises controlling an applied voltage to at least one fabry-perot interferometer pixel through a plurality of switches. The at least one fabry-perot interferometer pixel has a top and a bottom plate defining a gap therebetween wherein the at least one fabry-perot interferometer pixel produces a selected output color in response to the applied voltage. The method further includes controlling a test voltage to the at least one fabry-perot interferometer pixel through the plurality of switches during a calibration sequence to determine a gap capacitance in the at least one fabry-perot interferometer. The gap capacitance represents the relative position of the top plate with respect to the bottom plate.

25 Claims, 5 Drawing Sheets

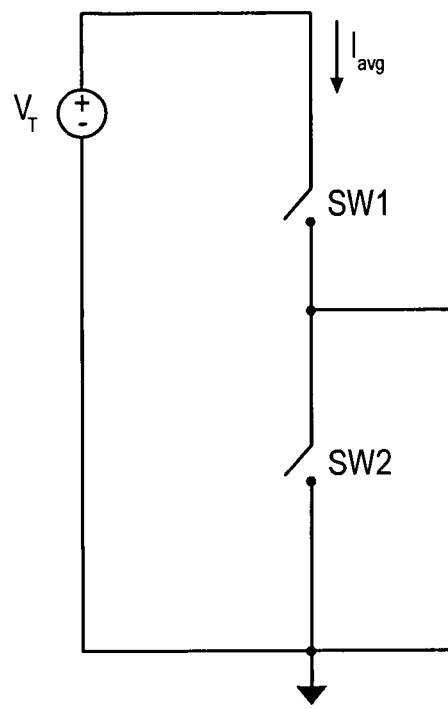
*FIG. 6*
$$\text{Reg} = \frac{V_T}{I_{avg}} = \frac{1}{C_G f_s} \implies C_G = \frac{I_{avg}}{V_T f_s}$$

CAPACITANCE GAP CALIBRATION

BACKGROUND

Display devices, such as televisions, projectors, monitors, and camcorder viewfinders employ of variety of methods for generating colored images onto a viewing surface. One of such methods includes implementing an image processing unit (i.e., a processor) that is configured to control the color output of a display device using a spatial light modulator. The image processing unit sends instructions or control signals to the spatial light modulator, which modulates an incoming light beam in order to project a colored image onto a viewing surface. Common spatial light modulators include Digital Light Processing ("DLP") chips and Liquid Crystal Based Panel Displays ("LCD").

One of the more recent developments in display technology includes a light modulator containing an array of pixel elements defined by microelectromechanical system (MEMS) devices configured to act as tunable Fabry-Perot Interferometers (FPIs). In general, MEMS devices are microscopic mechanical devices fabricated using integrated circuit manufacturing technologies. In some cases, their mechanical structures include small flexures, similar to springs, which are capable of flexing components of the device over a limited range of motion.

In optical applications, MEMS devices can be configured into tunable Fabry-Perot Interferometers (FPIs), which are light filters that transmit incoming light within a particular bandwidth but reject light that is outside of that bandwidth. Generally speaking, an FPI pixel is defined by a set of reflective plates that are separated by a gap. Incoming incident light from a light source reflects back and forth between the reflective plates. The gap between the plates provides interference to the incident light, which changes the light's incoming wavelength. Therefore, the wavelength of the resultant light that is transmitted from the FPI pixel is dependent on the distance between the reflective plates (i.e., the optical gap). In other words, the output color for each FPI pixel can be controlled by adjusting the distance between the reflective plates.

In one embodiment, the reflective plates of an MEMS FPI pixel are reflective capacitive plates that form a capacitor with a top movable plate having flexures, and a bottom fixed plate. The position of the plates, which defines the amount of gap therebetween, can be controlled by applying a voltage to each of the plates. The applied voltage creates an electrostatic field, which pulls the plates together. However, the flexures, which are spring-like structures that allow the top plate to move into position, exert a spring force that opposes the electrostatic field generated by the applied voltage. When the electrostatic field and the spring force are properly balanced, a stable optical gap is achieved that can be represented by the capacitance between the plates (i.e., gap capacitance). In other words, for a given optical gap (i.e., color) there is a corresponding gap capacitance that is determined based on a particular applied voltage. Therefore, the color output of an FPI pixel can be controlled by applying a voltage that will produce an expected gap capacitance.

Unfortunately, the expected gap capacitance changes over time due to a gradual change in the spring constant of the flexure regions. The change in spring constant affects the balance between the spring force and the electrostatic field when a voltage is applied. As a result, an applied voltage will produce a gap capacitance that varies over time. For this reason, it is advantageous to continually measure the gap capacitance and calibrate the relationship between the gap capacitance and the applied voltage.

Known methods for measuring capacitance in an FPI device include mechanically holding the FPI device in position with a probe to measure the capacitance. This method can be a slow and challenging process which requires costly test equipment. In addition, the process can only be applied once at the manufacturing stage prior to shipping. In this case, there is no way to calibrate the display device during regular use.

One known calibration method involves directly measuring the color using optical sensors. This method is beneficial in that the optical sensor interfaces directly with the light path, which provides an extremely accurate measurement of the light wavelength (i.e., color). However, measuring color using this method requires an optical sensor that can contribute significantly to the overall cost of the display.

The embodiments described hereinafter were developed in light of these and other drawbacks associated with measuring and calibrating a light modulator employing FPI pixels.

BRIEF DESCRIPTION OF THE DRAWINGS

The present embodiments will now be described, by way of example, with reference to the accompanying drawings, in which:

FIG. 6 illustrates an exemplary circuit representing a pixel according to FIG. 3.

DETAILED DESCRIPTION

A method is provided for calibrating a light modulation device using switched capacitor techniques. The light modulation device includes an array of microelectromechanical systems (MEMS) configured to act as tunable Fabry-Perot Interferometers (FPIs) ("pixels"). Each pixel has a top and bottom reflective plate that defines an optical gap therebetween. The width of the gap (i.e., the distance between the reflective plates) determines the color of light that is emitted from each pixel. To re-position the plates and change the color of the emitted light, a voltage is applied to the capacitor formed by the reflective plates, which creates a charge distribution on the capacitor plates. The distribution of charge induced by the voltage applied to the capacitor creates an electrostatic force that pulls the plates together. Because the position of the plates and the capacitance between them are correlative, the color of light emitted by each pixel can be determined by measuring the capacitance in the optical gap.

A switched capacitor technique is applied to the pixels of the light modulation device to measure the capacitance in the gap (i.e., gap capacitance) that is generated by the applied voltage. By applying switched capacitor techniques to a display implementing Fabry-Perot Interferometers, the capacitive plates that are used to control the optical gap are simultaneously used to measure gap capacitance. Using existing pixel switches to measure gap capacitance reduces the overall cost of the system by eliminating the need for additional components.

In some cases, the measurement process using the switched capacitor technique can be hindered by the mechanical response time of the capacitive plates in each pixel (i.e., the time it takes for the capacitive plates to settle into position before a measurement can be taken). To reduce the impact of this delay, a constant DC bias voltage can be applied to the capacitive plates so that the capacitive plates are kept into an approximate position prior to measuring.

Finally, the measured capacitance is used as part of a closed loop feedback control system, which compares the measured capacitance to stored capacitance data that was taken when the display device was initially calibrated at the factory. In this way, the applied voltage to achieve a particular color can be modified to accommodate the gradual change of the spring force in the flexure of an MEMS pixel.

Figure 1:
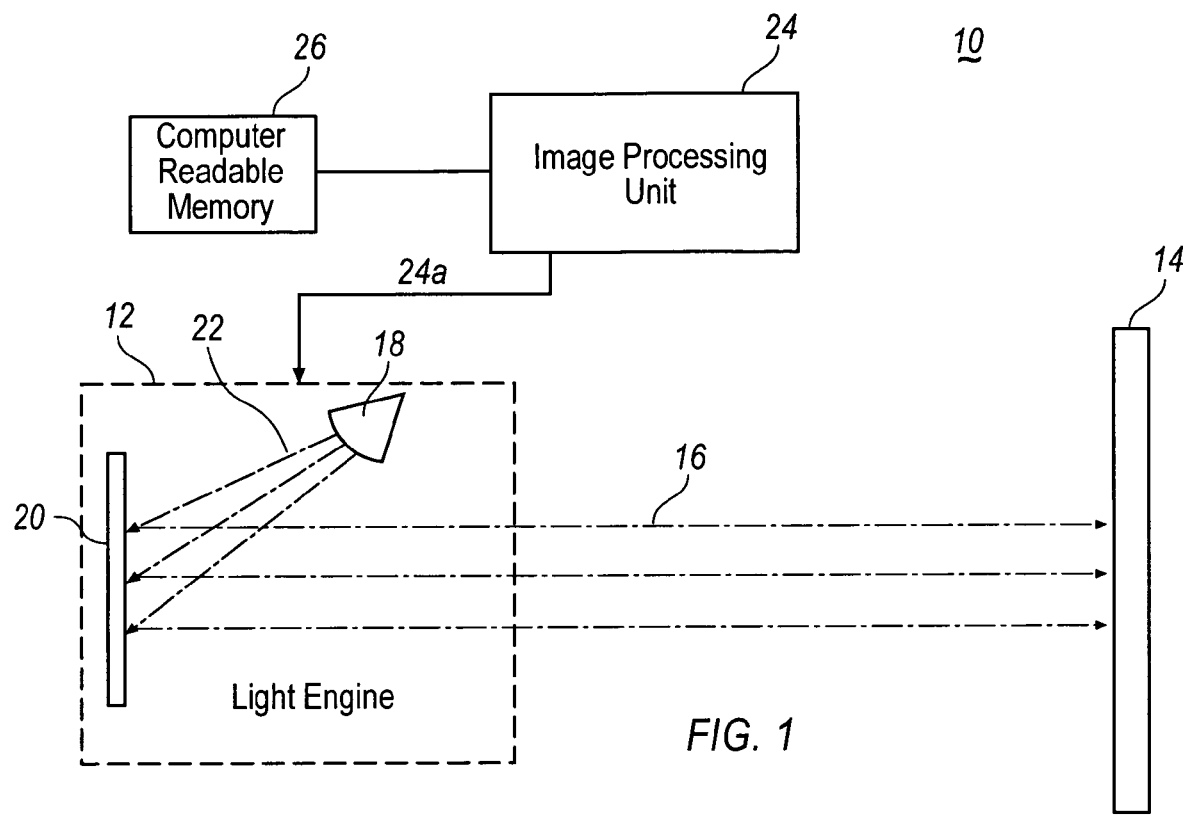
FIG. 1 illustrates an exemplary display system.

FIG. 1 illustrates an exemplary projection display system 10 including a light engine 12 and a viewing surface 14. Light engine 12 generates a full color, image bearing light beam 16 that is cast onto the viewing surface 14. Light engine 12 includes a light source 18 and a light modulating device 20, which generally comprises an array of pixel elements configured to modulate incoming light 22 from light source 18 to generate the full color image bearing light beam 16. An image processing unit 24 is configured to provide instructions from a computer readable memory 26 to light engine 12 via control signals 24a. The instructions from image processing unit 24 pertaining to light modulating device 20, control the color output of the image bearing light beam 16.

Figure 2:
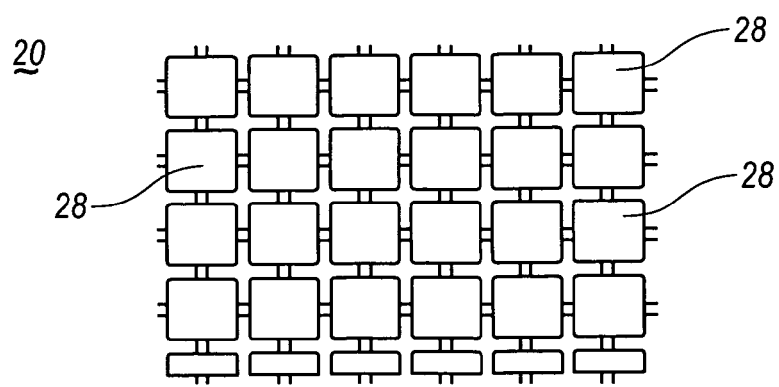
FIG. 2 illustrates a portion of an array of pixels according to an embodiment.
Figure 3:
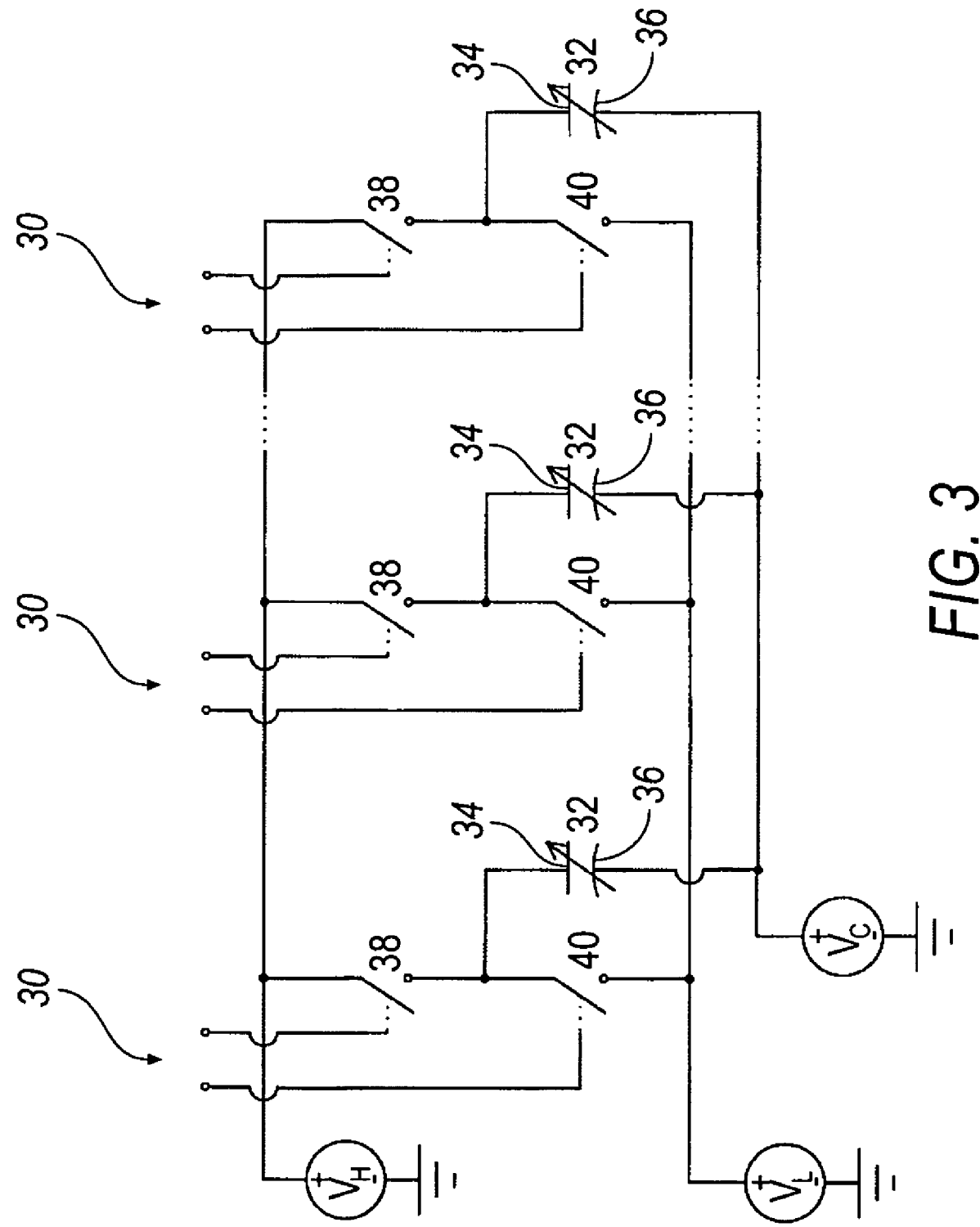
FIG. 3 illustrates a circuit diagram depicting an array of several pixels according to an embodiment.

FIG. 2 is a portion of the light modulating device 20 illustrating an array of pixels elements 28 that are defined by microelectromechanical (MEMS) devices that are configured to act as a Fabry-Perot Interferometers (FPIs). FIG. 3 shows an exemplary circuit diagram representing three of the pixel elements 28 shown in FIG. 2. Although only three pixel circuits 30 are shown in FIG. 3, one of ordinary skill in the art understands that an array of pixels 28 in a light modulating device 20 may contain any number of pixels 28 that may be connected in different configurations. The number and configuration of pixels 28 within a light modulating device 20 is dependent on the particular design criteria for a given projection system 10.

Each pixel circuit 30 in FIG. 3 includes an MEMS pixel capacitor 32 having a top 34 and a bottom 36 capacitor plate, a pull-up switch 38 connecting the top capacitor plate 34 to a supply voltage $V_H$, and a pull-down switch 40 connecting the top capacitor plate 34 to a supply voltage $V_L$. The bottom capacitor plate 36 may also be connected to a supply voltage $V_C$. In operation, the supply voltages $V_H$, $V_L$, and $V_C$ are used in combination with the pull-up 38 and pull-down 40 switches to re-position the capacitor plates 34, 36 to adjust the color of the pixels 28, and to calibrate the gap capacitance as a part of a calibration method. Advantageously, the same switches 38, 40 that are used to adjust the voltage, and therefore the color, of the MEMS pixel capacitor 32 are used to calibrate the pixel color and gap capacitance, as described in further detail below.

Figure 4:
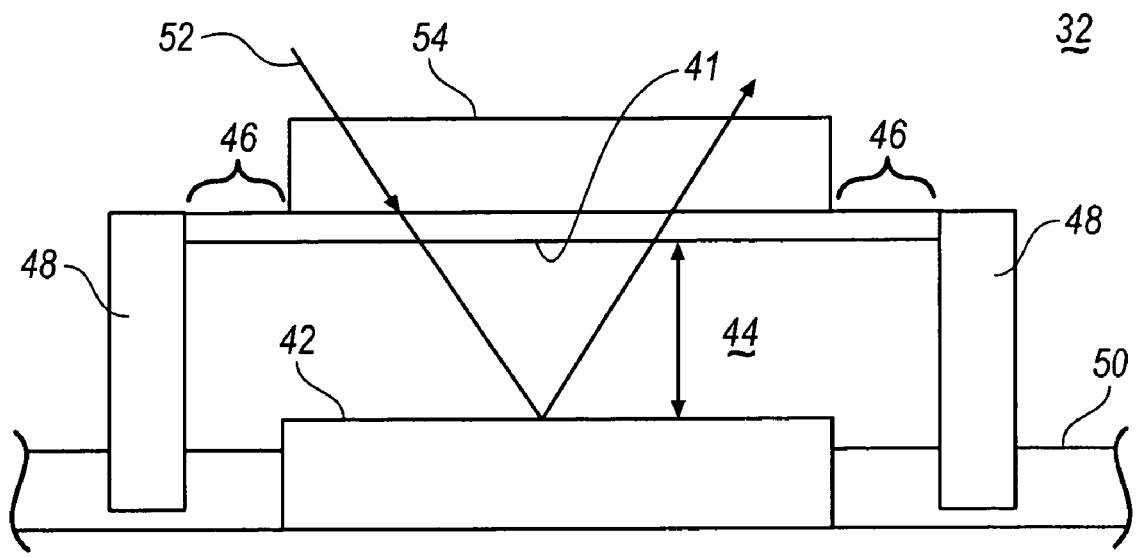
FIG. 4 illustrates an enlarged partial view of a pixel according to an embodiment.

FIG. 4 illustrates an exemplary pixel capacitor 32 according to FIG. 3 having a single gap configuration that includes a top reflective plate 41 and a bottom reflective plate 42 that define an optical gap 44 therebetween. The top reflective plate 41 includes spring-like flexure regions 46 at each end. Opposite the top reflective plate 41, the flexure regions 46 are connected to posts 48 that are embedded into a substrate 50. The posts 48 not only provide support for the flexure regions 46, but they provide an electrical connection between the top reflective plate 41 and the substrate 50.

In operation each pixel capacitor 32 receives a portion of incident white light 52 from light beam 22 (shown in FIG. 1), which penetrates the top reflective plate 41 into the optical gap 44. A narrow band pass filter is formed by the interference between the top 41 and bottom 42 reflective plates. In this way, the color of light reflected from the pixel is determined by the width of the optical gap 44 (i.e., the distance between the top reflective plate 41 and the bottom reflective plate 42). The width of the optical gap 44 is controlled by applying a voltage to the reflective plates 41, 42, which creates an electrostatic force therebetween. The force pulls the top plate 41 toward the bottom plate 42 thereby changing the width of the optical gap 44. In the present embodiment the bottom plate 42 is fixed such that all movement takes place with respect to the top plate 41. However, in alternative embodiments, both plates may be movable such that an applied voltage would create an electrostatic force that pulls both plates 41, 42 together. In addition, a transparent stiffener 54 may be provided on the surface of the top reflective plate 41 to provide support as the electrostatic force pulls the top plate 41 to the bottom plate 42. In this way, the bending occurs primarily at the flexure regions 46 rather than deflecting the entire top plate 41. The electrostatic force that is generated by the applied voltage is counterbalanced by the spring-like force of the flexure regions 46. The proper balancing of these forces allows the optical gap 44 between the top 41 and bottom 42 reflective plates to be adjusted according to a desired color. In the pixel configuration explained above, with reference to FIG. 4, the optical gap 44 that is defined by the distance between the top 41 and bottom 42 reflective plates is the same as the capacitor gap between the reflective capacitive plates 41, 42 for which a voltage is applied. In alternative embodiments, these gaps are separate.

Figure 5:
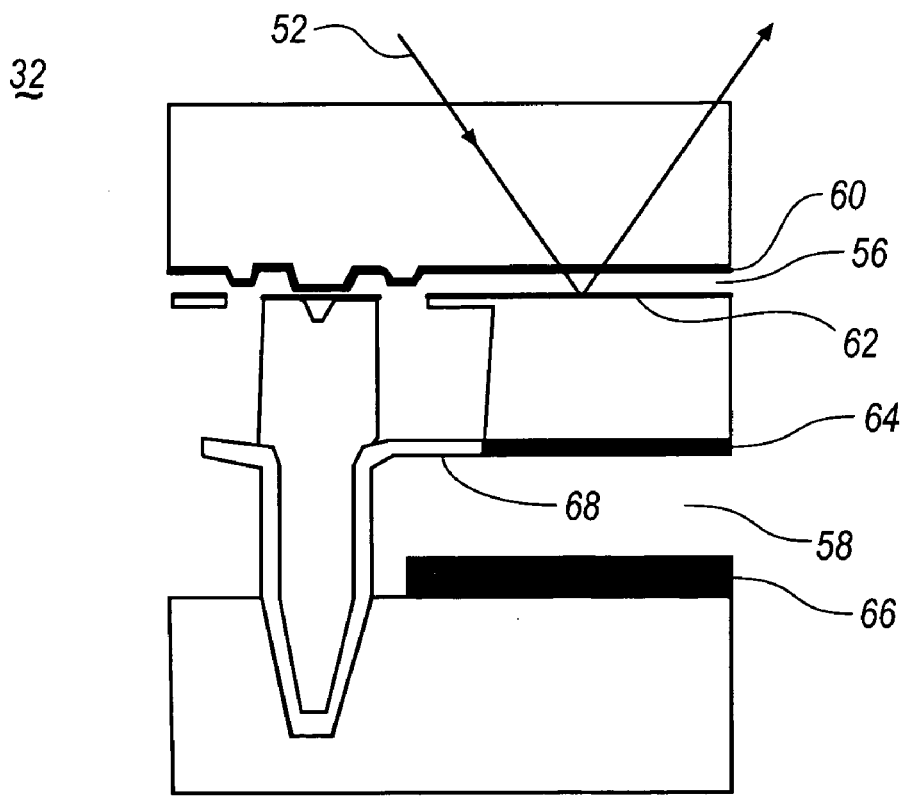
FIG. 5 illustrates an enlarged partial view of a pixel according to another embodiment.

For example, FIG. 5 illustrates an alternative MEMS pixel capacitor 32 having a dual gap configuration. Unlike the pixel configuration in FIG. 4, there are two gaps in the pixel arrangement, one optical gap 56 and one capacitor gap 58. The optical gap 56 is defined by the distance between a top reflective plate 60 and bottom reflective plate 62, while the capacitor gap 58 is defined by the distance between a top capacitor plate 64 and a bottom capacitor plate 66. Similar to the pixel configuration of FIG. 4, the color of light reflected from the pixel is still dependent on the width of the optical gap 56. The difference, however, is that the width of the optical gap 56 is changed by applying a voltage across the capacitor plates 64, 66. In this way, the voltage applied to the capacitor plates 64, 66 creates an electrostatic force that pulls the top capacitor plate 64 to the bottom capacitor plate 66 at a flexure region 68. The movement of the flexure region 68 coincides with the movement of the bottom reflector 62, thereby adjusting the optical gap 56 in proportion to the voltage applied to the capacitor plates 64, 66.

As explained in detail above with reference to FIG. 4, the color emitted from a pixel is directly dependent on the optical gap (i.e., the distance between the reflective plates). The optical gap is controlled by the voltage applied to the reflective plates. Therefore, the position of the plates, and hence the color, can be determined during a calibration sequence by measuring the capacitance between the plates (i.e., gap capacitance). Accordingly, a switched capacitor technique is used to measure the gap capacitance in an MEMS pixel capacitor configured to act as a Fabry-Perot Interferometer. Any number of switched capacitor techniques can be employed to measure the capacitance of pixel 28 including Charged-Based Capacitance Measurement (CBCM) and Charge Injection Error Free CBCM (CIEF-CBCM). Each of these switched capacitor techniques is described in the papers entitled, "An on-chip, attofarad interconnect charge-based capacitance measurement (CBCM) technique", Chen, J. C.; McGaughy, B. W.; Sylvester, D.; Chenming Hu; Electron Devices Meeting, 1996., International, 8-11 Dec. 1996, pages 69-72, and "A novel simple CBCM method free from charge injection-induced errors", Yao-Wen Chang; Hsing-Wen Chang; Chung-Hsuan Hsieh; Han-Chao Lai; Tao-Cheng Lu; Wenchi Ting; Ku, J.; Chih-Yuan Lu; Electron Device Letters, IEEE, Volume: 25, Issue: 5, May 2004 pages 262-264, both of which are herein incorporated by reference in their entirety.

Although a switched capacitor circuit can take many forms, the basic premise is that the capacitance can be determined based on a measured average current, a known applied voltage, and a known capacitor switching frequency. The relationship is derived by treating the capacitor circuit as an equivalent resistance. For example, FIG. 6 shows an equivalent electrical circuit 70 representing the configuration of one of the exemplary pixel circuits 30 of FIG. 3. The applied total voltage $V_T$ (i.e., $V_H +/- V_L$) is connected to pixel capacitor 32 by switches SW1 and SW2 (representing the pull-up 38 and pull-down 40 switches from FIG. 3). The average current $I_{avg}$, which is the average of the measured current over a number of switching cycles, is measured prior to switch SW1 using a current measuring device that is incorporated onto the MEMS pixel device. An optional DC bias voltage $V_{BIAS}$ (i.e., $V_C$) is applied to the bottom plate of the pixel capacitor 32 in order to maintain an approximate pixel position. The application of the DC bias voltage will be discussed in greater detail below.

The gap capacitance $C_G$ at pixel capacitor 32 is obtained by recognizing that the circuit 70 can be viewed as an equivalent resistance circuit $R_{eq}$ as shown in FIG. 6, where $R_{eq}$ is equal to the applied voltage $V_T$ divided by the average measured current $I_{avg}$, which is also equal to one over the gap capacitance $C_G$ times the switching frequency $f_s$. Therefore, the gap capacitance $C_G$ is equal to the average measured current $I_{avg}$ divided by the applied voltage $V_T$ times the switching frequency $f_s$. Accordingly, if the applied voltage $V_T$ to pixel capacitor 32 and the switching frequency $f_s$ are known, one could measure the average current over a determined number of switching cycles to obtain the gap capacitance $C_G$. Although the preceding measurement process has been explained with reference to a single pixel, one of ordinary skill in the art understands that a light modulating device 20 will contain a plurality of capacitor pixels, some of which are connected in parallel. Therefore, measurements may be taken for each individual capacitor pixel or for an array of capacitor pixels.

With continued reference to FIG. 6, one challenge in measuring gap capacitance $C_G$, using the switched capacitor technique described above, is the ability to operate the pixel circuit 70 at a fast enough switching speed to provide measurable currents while at the same time allowing adequate settling time (the time required for the capacitor to discharge and then to fully charge to the applied test voltage potential). For a given capacitance and applied voltage, the settling time is limited by the resistance of the switches SW1 and SW2, and the mechanical response time of the capacitor plates. One way to reduce the impact of the mechanical response time is by keeping the capacitor plates in an approximate position by applying a constant DC bias voltage to the pixel capacitor plates. In this way, in non-calibration mode, the pixel capacitor plates are charged to a certain fixed DC voltage and then held at that voltage for a moment until it is refreshed to a new voltage (i.e., color). During calibration mode, which is discussed in detail below, a fixed DC voltage is applied to the capacitor and then a switched test voltage is superimposed upon that fixed voltage. This results in a smaller voltage change during calibration mode which increases the switching speed and reduces the mechanical response time.

Once the gap capacitance is known, the value of gap capacitance can be used in a closed loop feedback calibration system. At the factory, prior to shipping to the consumer, the light modulating device 20 is tested and calibrated to generate a calibration reference memory that contains the relationship between the gap capacitance and the applied voltage. As discussed above, the gap capacitance is relative to the position of the reflective capacitor plates, and thus, it is the distance between the plates (i.e., the optical gap) that determines the color transmitted from the pixel. The amount of applied voltage that is necessary to achieve a particular optical gap is dependent on the opposing spring force of the flexures, which as previously discussed, will gradually change over time. Therefore, gap capacitance measurements taken during a calibration sequence using the switched capacitor technique can be compared to the capacitance and applied voltage in the calibration reference memory generated during manufacturing to determine if the applied voltage needs to be adjusted. The calibration sequence can be initiated at anytime during normal operation of the display device or during a start up phase, such as when the display device is turned on.

As an example of an exemplary calibration sequence, assume that a test voltage of 1V was applied to the reflective capacitor plates of a pixel capacitor. The applied voltage generates a capacitance in the optical gap of 1 pF, which positioned the reflective plates such that the color blue was transmitted from the pixel. Therefore, when a capacitance measurement is taken during calibration mode, and a test voltage of 1V is applied, one would expect the measured capacitance to be equal to 1 pF. If it is not, then it can be assumed that the spring force has changed and that the applied voltage needs to be adjusted in order to properly produce the blue light. Because the relationship between the capacitance and applied voltage is constant throughout the color spectrum, it is only necessary to measure and calibrate for one applied voltage. Accordingly, the remainder of the color spectrum can be determined and calibrated by extrapolating the one measured capacitance value to the remainder of the given color spectrum.

Figure 7:
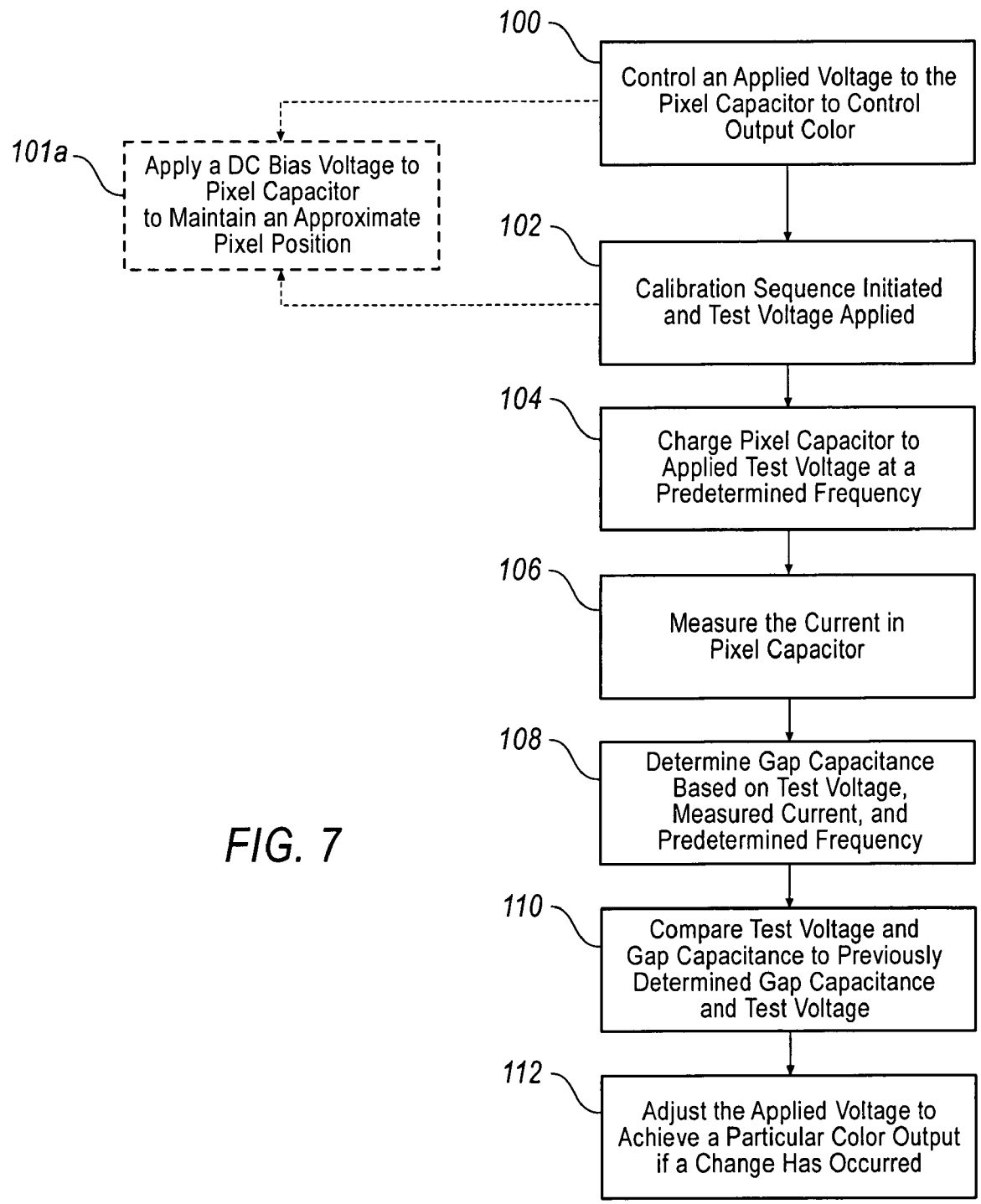
FIG. 7 is a flow diagram illustrating exemplary steps for calibrating a display device according to an embodiment.

An exemplary calibration sequence is illustrated in the flow diagram of FIG. 7. References to physical components refer to the exemplary components illustrated in FIGS. 1 and 3. At step 100 of FIG. 7, the color output of the fabry-perot pixel capacitor 32 is controlled during a non-calibration mode by applying a voltage across the plates 34, 36 of the capacitor 32 through the pull-up and pull-down switches 38, 40. At step 102, the image processing unit 24 initiates a calibration sequence by applying a test voltage through the pull-up and pull-down switches 38, 40. The switches 38, 40 cycle on and off at step 104 to charge the pixel capacitor plates at a predetermined frequency. Once the pixel capacitor 32 has been charged to the test voltage, the current flowing to the pixel capacitor 32 is measured at step 106 using an on-chip current measuring device. As an optional step, a DC bias voltage can be applied at step 101a to place the capacitor plates into a predetermined approximate position prior to measuring the current in step 106. At step 108, the gap capacitance is determined based on the test voltage, the measured current, and the predetermined frequency. At step 110, the test voltage and determined gap capacitance are compared to the previously applied test voltage and gap capacitance information stored in a database in the image processing unit 24. If there has been no change to the expected relationship between the test voltage and the gap capacitance, no adjustments are made to the applied voltages. However, if a change has occurred in the relationship between the test voltage and the gap capacitance, the applied voltage to achieve a particular color output is adjusted at step 112 to compensate for the change.

While the present invention has been particularly shown and described with reference to the foregoing preferred embodiment, it should be understood by those skilled in the art that various alternatives to the embodiments of the invention described herein may be employed in practicing the invention without departing from the spirit and scope of the invention as defined in the following claims. It is intended that the following claims define the scope of the invention and that the method and system within the scope of these claims and their equivalents be covered thereby. This description of the invention should be understood to include all novel and non-obvious combinations of elements described herein, and claims may be presented in this or a later application to any novel and non-obvious combination of these elements. The foregoing embodiment is illustrative, and no single feature or element is essential to all possible combinations that may be claimed in this or a later application. Where the claims recite "a" or "a first" element of the equivalent thereof, such claims should be understood to include incorporation of one or more such elements, neither requiring nor excluding two or more such elements.

What is claimed is:

1. A method for calibrating a display device, comprising:
   controlling an applied voltage to at least one fabry-perot interferometer pixel through a plurality of switches, said at least one fabry-perot interferometer pixel having a top and a bottom plate defining a gap therebetween;
   wherein said at least one fabry-perot interferometer pixel produces a selected output color in response to said applied voltage; and
   controlling a test voltage to said at least one fabry-perot interferometer pixel through said plurality of switches during a calibration sequence to determine a gap capacitance in said at least one fabry-perot interferometer;
   wherein said gap capacitance represents a relative position of said top plate with respect to said bottom plate.

2. The method according to claim 1, further including:
   configuring said plurality of switches to cycle on and off according to a predetermined frequency; and
   measuring a current in said at least one fabry-perot interferometer pixel through said plurality of switches.

3. The method according to claim 1, further comprising:
   applying a DC bias voltage to said at least one fabry-perot interferometer pixel to maintain a predetermined relative position between said top and said bottom plates.

4. The method according to claim 1, further comprising:
   comparing said test voltage and said gap capacitance to a previous gap capacitance to determine a change in a relationship between said test voltage and said gap capacitance.

5. The method according to claim 4, further comprising:
   adjusting said applied voltage to said at least one fabry-perot interferometer pixel through a plurality of switches based on a change in said relationship between said test voltage and gap capacitance.

6. The method according to claim 1, further comprising:
   generating a database containing information relating to a relationship between said test voltage and said gap capacitance.

7. A method for calibrating a display device using a switched capacitor technique, comprising:
   controlling an applied voltage to at least one fabry-perot interferometer pixel through a plurality of switches, said at least one fabry-perot interferometer pixel having a top and a bottom plate defining a gap therebetween;
   wherein said at least one fabry-perot interferometer pixel produces a selected output color in response to said applied voltage;
   controlling a test voltage to said at least one fabry-perot interferometer pixel through said plurality of switches during a calibration sequence by cycling said switches on and off at a predetermined frequency;
   measuring a current in said at least one fabry-perot interferometer pixel through said plurality of switches; and
   determining a gap capacitance in said at least one fabry-perot interferometer using said test voltage, said predetermined frequency, and said current.

8. The method according to claim 7, wherein said plurality of switches includes at least one pull-up and at least one pull-down switch.

9. The method according to claim 7, further comprising:
   applying a DC bias voltage to said at least one fabry-perot interferometer pixel to maintain a predetermined relative position between said top and said bottom plates.

10. The method according to claim 7, wherein said at least one fabry-perot interferometer pixel is an array of fabry-perot interferometer pixels.

11. The method according to claim 10, wherein the step of measuring the current further includes measuring the current in said array of fabry-perot interferometer pixels simultaneously.

12. The method according to claim 7, further comprising:
   comparing said test voltage and said gap capacitance to a previous gap capacitance to determine a change in a relationship between said test voltage and said gap capacitance.

13. A display device, comprising:
   a means for controlling an applied voltage to at least one fabry-perot interferometer pixel through a plurality of switches, said at least one fabry-perot interferometer pixel having a top and a bottom plate defining a gap therebetween;
   wherein said at least one fabry-perot interferometer pixel produces a selected output color in response to said applied voltage;
   a means for controlling a test voltage to said at least one fabry-perot interferometer pixel through said plurality of switches during a calibration sequence by cycling said switches on and off at a predetermined frequency;
   a means for measuring the current in said at least one fabry-perot interferometer pixel through said plurality of switches; and
   a means for determining a gap capacitance in said at least one fabry-perot interferometer using said test voltage, said predetermined frequency, and said current.

14. The display device according to claim 13, further comprising:

a means for applying a DC bias voltage to said at least one fabry-perot interferometer pixel to maintain a predetermined relative position between said top and said bottom plates.

15. A display device, comprising:
at least one fabry-perot interferometer pixel having a top and a bottom plate defining a gap therebetween;
a plurality of switches configured to control a predetermined applied voltage to said at least one fabry-perot interferometer pixel;
wherein said at least one fabry-perot interferometer pixel is configured to produce a selected output color in response to said predetermined applied voltage; and
a test voltage applied through said plurality of switches to said at least one fabry-perot interferometer pixel during a calibration sequence to determine a capacitance in said gap of said at least one fabry-perot interferometer pixel.

16. A display device according to claim 15, wherein said plurality of switches includes at least one pull-up and at least one pull-down switch.

17. A display device according to claim 15, further including a DC bias voltage applied to said at least one fabry-perot interferometer pixel to maintain a predetermined relative position between said top and said bottom plates.

18. A display device according to claim 15, further including:
a closed loop feed back system configured to calibrate said display device by comparing said test voltage and said gap capacitance to a previously determined gap capacitance to detect a change in a relationship between said test voltage and said gap capacitance.

19. An image processing unit having instructions thereon for calibrating a display device, said instructions being configured to instruct said processing unit to perform the steps of:
controlling an applied voltage to at least one fabry-perot interferometer pixel through a plurality of switches, said at least one fabry-perot interferometer pixel having a top and a bottom plate defining a gap therebetween;
wherein said at least one fabry-perot interferometer pixel produces a selected output color in response to said applied voltage;
controlling a test voltage to said at least one fabry-perot interferometer pixel through said plurality of switches during a calibration sequence to determine a gap capacitance in said at least one fabry-perot interferometer;
wherein said gap capacitance represents a relative position of said top plate with respect to said bottom plate.

20. The image processing unit of claim 19, further having instructions thereon for performing the step of:
configuring said plurality of switches to cycle on and off according to a predetermined frequency; and
measuring a current in said at least one fabry-perot interferometer pixel through said plurality of switches.

21. The image processing unit of claim 19, further having instructions thereon for performing the step of:
applying a DC bias voltage to said at least one fabry-perot interferometer pixel to maintain a predetermined relative position between said top and said bottom plates.

22. The image processing unit of claim 19, further having instructions thereon for performing the step of:
comparing said test voltage and said gap capacitance to a previous gap capacitance to determine a change in a relationship between said test voltage and said gap capacitance.

23. The image processing unit of claim 19, further having instructions thereon for performing the step of:
adjusting said applied voltage to said at least one fabry-perot interferometer pixel through a plurality of switches based on a change in said relationship between said test voltage and gap capacitance.

24. The image processing unit of claim 19, further having instructions thereon for performing the step of:
generating a database containing information relating to a relationship between said test voltage and said gap capacitance.

25. A method for calibrating a display device, comprising:
controlling an applied voltage to at least one fabry-perot interferometer pixel through a plurality of switches, said at least one fabry-perot interferometer pixel having a top and a bottom plate defining a gap therebetween;
wherein said at least one fabry-perot interferometer pixel produces a selected output color in response to said applied voltage;
applying a DC bias voltage to said at least one fabry-perot interferometer pixel to maintain a predetermined relative position between said top and said bottom plates;
controlling a test voltage to said at least one fabry-perot interferometer pixel through said plurality of switches during a calibration sequence by cycling said switches on and off at a predetermined frequency;
measuring a current in said at least one fabry-perot interferometer pixel through said plurality of switches;
determining a gap capacitance in said at least one fabry-perot interferometer using said test voltage, said predetermined frequency, and said current;
comparing said test voltage and said gap capacitance to a previous gap capacitance to determine a change in a relationship between said test voltage and said gap capacitance; and
adjusting said applied voltage to said at least one fabry-perot interferometer pixel through a plurality of switches based on a change in said relationship between said test voltage and gap capacitance.

* * * * *